(12) United States Patent
Eckert et al.

(10) Patent No.: US 8,969,488 B2
(45) Date of Patent: Mar. 3, 2015

(54) METHOD OF MIXING AND DEVICE USEFUL THEREOF

(75) Inventors: Rolf Eckert, Halle (DE); Guenter Kleis, Halle (DE); Uwe Pfannmoller, Halle (DE); Volkmar Voerckel, Merseburg (DE); Jens-Peter Wiegner, Halle (DE)

(73) Assignee: Equipolymers GmbH, Schkopau (DE)

( * ) Notice: Subject to any disclaimer, the term of this patent is extended or adjusted under 35 U.S.C. 154(b) by 0 days.

(21) Appl. No.: 13/876,948

(22) PCT Filed: Aug. 31, 2011

(86) PCT No.: PCT/EP2011/004399
§ 371 (c)(1),
(2), (4) Date: Mar. 29, 2013

(87) PCT Pub. No.: WO2012/041436
PCT Pub. Date: Apr. 5, 2012

(65) Prior Publication Data
US 2013/0184416 A1   Jul. 18, 2013

Related U.S. Application Data

(60) Provisional application No. 61/388,155, filed on Sep. 30, 2010.

(51) Int. Cl.
| | | |
|---|---|---|
| C08G 63/00 | (2006.01) |
| B01F 15/02 | (2006.01) |
| B01F 3/14 | (2006.01) |
| B01F 7/08 | (2006.01) |
| B29B 7/80 | (2006.01) |
| C08G 85/00 | (2006.01) |

(52) U.S. Cl.
CPC ............... *B01F 15/0274* (2013.01); *B01F 3/14* (2013.01); *B01F 7/085* (2013.01); *B01F 15/0266* (2013.01); *B29B 7/806* (2013.01); *C08G 85/004* (2013.01); *B01F 2215/0049* (2013.01)
USPC ............ 525/444; 525/437; 528/486; 528/496

(58) Field of Classification Search
CPC ..... C08G 63/91; C08G 63/914; C08G 63/916
USPC ........................... 525/437, 444; 528/486, 496
See application file for complete search history.

(56) References Cited

U.S. PATENT DOCUMENTS

| | | | |
|---|---|---|---|
| 2,998,963 A | | 9/1961 | Rinderle |
| 3,884,850 A | * | 5/1975 | Ostrowski .................... 521/48.5 |
| 7,297,721 B2 | | 11/2007 | Kulkarni |
| 2005/0187306 A1 | | 8/2005 | Kulkarni |

FOREIGN PATENT DOCUMENTS

| | | |
|---|---|---|
| DE | 10 2006 015541 A1 | 10/2007 |
| EP | 1666133 A1 | 6/2006 |
| JP | H10-101784 A | 4/1998 |
| WO | 98/41375 A1 | 9/1998 |

OTHER PUBLICATIONS

International Search Report issued on Feb. 2, 2012 for International Application No. PCT/EP2011/004399.

\* cited by examiner

*Primary Examiner* — Robert Jones, Jr.
(74) *Attorney, Agent, or Firm* — Knobbe, Martens, Olson & Bear, LLP

(57) ABSTRACT

The invention generally relates to a method of substantially homogeneously mixing ingredients comprising solid thermoplastic particulates and a viscous material in a container and apparatus useful therein. The invention also generally relates to a non-clogging device and mixing apparatus comprising same.

12 Claims, 3 Drawing Sheets

METHOD OF MIXING AND DEVICE USEFUL THEREOF

BACKGROUND OF THE INVENTION

1. Field of the Invention

The invention generally relates to a method of substantially homogeneously mixing ingredients comprising solid particulates and a viscous material in a container. The invention also generally relates to a non-clogging device and mixing apparatus.

2. Background Art

Poly(ethylene terephthalate) (PET or polyethylene terephthalate) has many uses such as, for example, for making synthetic fibers and food-grade containers (e.g., beverage bottles). U.S. Pat. No. 7,297,721 B2; PCT International Patent Application Publication Number WO 98/41375 A; and Japanese Patent Application Number JP H10-101784 A all mention using homogeneous mixtures of recycled poly(ethylene terephthalate) (RPET) and poly(ethylene terephthalate) (PET) monomers comprising terephthalic acid (TPA) and monoethylene glycol (MEG) in processes to manufacture PET. Their processes all require melting the RPET to prepare the homogeneous mixtures and intimately expose the RPET to the full transesterifying affect of MEG, whereupon, among other things, the MEG depolymerizes the melted RPET by transesterification. For example, in U.S. Pat. No. 7,297,721 B2, the process adds a paste of TPA, isophthalic acid (IPA), and MEG to an esterification reactor, stops the addition, adds flakes of RPET, and then resumes adding additional paste. The RPET melts in the esterification reactor before fully mixing with the paste. In WO 98/41375 A, the process adds RPET as a melt or a solid to an esterification reactor containing a melt of PET precursors. The added solid RPET melts in the esterification reactor before fully mixing with the PET precursors. In JP H10-101784 A, the process melts RPET in an extruder, and then adds the melted RPET to an esterification reactor. The JP H10-101784 A process separately adds a slurry of TPA and MEG to the esterification reactor. In all of the aforementioned processes, the processes require melting RPET to form the homogeneous mixtures comprising RPET, TPA, and MEG so as to intimately expose the RPET to the full transesterifying affect of MEG.

As is generally known and known from the above-referenced patent documents, RPET gradually decomposes when it is near or above its melting temperature (e.g., RPET flakes melt at about 245 degrees Celsius). If left unchecked, melted RPET will decompose to an extent that it would become unsuitable for preparing food-grade PET.

There is a need in the art for an improved method of manufacturing PET using RPET.

BRIEF SUMMARY OF THE INVENTION

The inventors have recognized that the prior art requirement of first melting RPET solids before the RPET can form homogeneous mixtures with PET monomers is a deficiency of the prior art processes in view of the thermal decomposition liability of RPET. Accordingly, the inventors sought to reduce the period of time RPET spends in a melt phase but not also in homogeneous admixture with MEG during manufacturing of PET. At the esterification stage of PET manufacturing in particular, the inventors sought to reduce how long RPET would be exposed to decomposition conditions without also being intimately exposed to the full transesterifying affect of MEG. They desired a flexible solution in order to achieve this advantage without altering their esterification reaction conditions, since these had been optimized for production of food-grade PET. For example, the inventors desired to maintain the same reaction temperature and avoid using any solvent in their esterification reactor.

The inventors describe herein a solution to the problem of mixing ingredients comprising RPET flakes and a paste comprising TPA and MEG in an esterification reactor in a reduced period of time compared to period of time for melting one or both of the ingredients and mixing them together. The inventors' solution comprises feeding a modified phase of RPET flakes into the esterification reactor. The modified phase of RPET flakes comprises a substantially homogeneous predispersion comprising the RPET flakes and a major portion of the paste. The solution also comprises separately feeding the remaining portion (i.e., minor portion) of the paste into the esterification reactor. The predispersion and remaining portion feeds enter the esterification reactor via a same inlet or different inlets thereof. The paste comprises an excess quantity of MEG (or, e.g., MEG and diethylene glycol (DEG)) capable of rapidly transesterifying substantially all of the RPET, preferably so as to produce ethylene terephthalate oligomers and proportionately reduce or prevent thermal decomposition of the RPET. The remaining quantity of MEG (or MEG and DEG) in the minor portion of the paste can be fed directly into the esterification reactor without depriving the RPET of a full transesterifying affect of MEG (or MEG and DEG). The substantially homogeneous predispersion of RPET flakes provides the RPET with exposure to substantially full transesterifying effect of MEG even before the RPET is melted and does not require altering of their esterification reaction conditions. Preferably, the paste and modified phase of RPET flakes further comprise isophthalic acid (IPA), a polycondensation catalyst, and diethylene glycol (DEG). The polycondensation catalyst means a substance effective for catalyzing an esterification reaction, transesterification reaction, or preferably esterification and transesterification reactions. In some embodiments the solution also advantageously produces a homogeneous mixture of RPET and ethylene terephthalate oligomers (described later) in the esterification reactor in significantly less time, with significantly less decomposition of the RPET, or both compared to period of time for melting the RPET flakes and fully mixing them and the PET monomers together in the esterification reactor. Advantageously, the inventors' solution can be used in continuous feed and batch fed processes. Further, the inventors discovered that their solution can be applied to the mixing of any solid thermoplastic particulates, not just RPET flakes, with any viscous material containing the sufficient excess quantity of a reactant for the solid thermoplastic particulate as described later, not just the paste comprising MEG. The invention is especially valuable for, and in some embodiments comprises, mixing the reactant(s) with solid thermoplastic particulates that contain a thermoplastic material that is prone to thermal decomposition (under the circumstances), wherein the mixing is done in such a way that the reactant can react with the thermoplastic material and reduce the thermal decomposition thereof. Preferably, the solid thermoplastic particulates are aromatic polyester resin particulates, and more preferably PET resins.

In pursuing the aforementioned solution, the inventors discovered a problem when they tried to continuously feed a homogeneous paste comprising RPET flakes, TPA, and MEG, and preferably further comprising the IPA, polycondensation catalyst, and DEG, from a Segler double shaft screw blender containing a single cone-shaped discharge portion containing two outlets. The paste clogged the outlets of the Segler double shaft screw blender. Further, when the paste was being fed into an esterification reactor containing hot MEG vapor (e.g., >200° C. at an overpressure of from 0.5 bar (50 kilopascals (kPa) to 1 bar (100 kPa) above ambient pressure) in its headspace, the inventors discovered that hot MEG vapor promptly initiated decomposing of the paste and caused bridging with unmelted RPET flakes, resulting in agglomerated RPET flakes clogging paste feed lines. The inventors' solution generally comprises replacing the single cone-shaped discharge portion of the Segler double shaft screw blender with a plurality of smaller sized discharge cones as described later so as to enable clog-free operation of the resulting modified apparatus under the circumstances. Further, the inventors discovered that the modification can be applied to any container in need of a discharge portion, especially one in need of a clog-free discharge portion.

In a first embodiment the present invention provides a method of mixing ingredients comprising solid thermoplastic particulates and a viscous material in a first container without first melting the solid thermoplastic particulates, the method comprising feeding a predispersion comprising a substantially homogeneous mixture of the solid thermoplastic particulates and a major portion of the viscous material and feeding the remaining minor portion of the viscous material into the first container to give added ingredients in the first container; and mixing the added ingredients in the first container, wherein the solid thermoplastic particulates comprises a thermoplastic material and the major portion of the viscous material comprises a sufficient excess quantity of a reactant for the thermoplastic material. Still more preferably, the solid thermoplastic particulates are RPET particulates. Preferably, the RPET particulates are RPET pellets or, more preferably, RPET flakes.

In a second embodiment the present invention provides a device for discharging a material from a second container without the material clogging the device, the device comprising a plurality of discharge cones; wherein each discharge cone has spaced-apart upstream and downstream apertures in fluid communication with each other, diameter of the upstream aperture being at most 4 times larger than diameter of the downstream aperture; wherein each discharge cone independently defines a volumetric space between the upstream and downstream apertures that is dimensioned and configured for containing a non-clogging amount of the material; and wherein each discharge cone independently is adapted for receiving the non-clogging amount of the material into the volumetric space through the upstream aperture and discharging the non-clogging amount of the material out of the volumetric space through the downstream aperture without clogging the device. Preferably, the device further comprises the second container and is in operative connection to the second container in such a way that a material contained in the second container can be discharged therefrom via the device without clogging the device.

In another embodiment the present invention provides an apparatus for mixing a material, wherein the apparatus comprises the device as in the second embodiment and a mixing portion (e.g., twin screw conveyor/mixer) comprising a second container; wherein the second container has a downstream outlet defining an opening and is sealably connected to the device around and proximal to the upstream apertures of the device in such a way that the device restricts the opening of the downstream outlet of the second container to the openings of the upstream apertures of the device; and the apparatus functions in such a way that when the second container of the apparatus contains a material, the material can be discharged from the apparatus via the device without clogging the device.

The invention method is useful for preparing the predispersion and adding it into the first container (e.g., an esterification reactor) and thereby exposing RPET to substantially full transesterifying effect of MEG even before the RPET is melted. The invention method can be adapted to current manufacturing processes and does not require altering their esterification reaction conditions. The invention method reduces period of time RPET spends in a melt phase at high temperature (e.g., >200° C.) but not also in admixture with MEG during manufacturing of PET. In some embodiments the invention method reduces how long RPET would be exposed to decomposition conditions without also being exposed to the transesterifying affect of MEG. In some embodiments the invention method is also useful for producing a homogeneous mixture of ingredients comprising the solid thermoplastic particulates (e.g., RPET flakes) and the viscous material (e.g., a paste comprising TPA, MEG, IPA, DEG, and a polycondensation catalyst) in the first container (e.g., an esterification reactor) in a reduced period of time compared to period of time for melting the solid thermoplastic particulates and fully mixing them with the viscous material in the first container (e.g., esterification reactor). Advantageously, the invention method can be used in continuous feed and batch fed processes. The invention method can be employed in, for example, a process for preparing quality-grade PET (e.g., food-grade PET) that employs RPET and PET monomers. The invention method is useful in other processes for reacting ingredients of the predispersion and viscous mixture together.

The invention device and apparatus are useful for discharging the material from the device or apparatus without clogging same, even when the first container has hot MEG vapor in its headspace. Thus, the invention device and apparatus are useful in any discharging operation and are especially useful in manufacturing discharge operations, including quality-grade PET manufacturing discharge operations.

As used herein, the term "clogging" means blocking at least 33 area percent of an outlet or blocking at least 33 percent of maximum flow from the outlet under the circumstances. In some embodiments clogging means blocking at least 50 area percent, in some embodiments at least 70 area percent, and in some embodiments at least 95 area percent of the outlet. In some embodiments clogging means blocking at least 50 percent of maximum flow from, in some embodiments at least 70 percent of maximum flow from, and in some embodiments at least 95 percent of maximum flow from the outlet under the circumstances.

The term "homogeneous" means uniformly mixed.

The term "ingredient" means a substance added to, or to be added to, the first or second container.

The term "IPA" means isophthalic acid, which has the following structural formula:

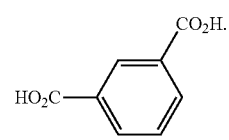

The term "major portion" means greater than 50 percent. The term "minor portion" means less than 50 percent. Preferably, the major and minor portions together equal 100 percent (that is, there is no portion lost to scrap or leakage).

The term "MEG" means monoethylene glycol, which has the following empirical formula: $HOCH_2CH_2OH$.

The term "melting" means heating until liquefied.

The term "mixing" means an act comprising blending.

The term "PET" means poly(ethylene terephthalate).

The term "RPET" means recycled poly(ethylene terephthalate).

The term "solid thermoplastic particulates" means a finely divided substance that is not a liquid, gas, or plasma and has a melting point of from −20° C. to 500° C., preferably 20° C. to 300° C. The finely divided substance can be amorphous or crystalline. In some embodiments, the finely divided substance has a maximum length (or diameter) of 20 millimeters (mm) and a minimum length (or diameter) of 0.5 mm. The finely divided substance can also contain immaterial amounts (e.g., less than 5 weight percent) of a residual liquid (e.g., MEG, DEG, or water) or gas (e.g., surface-adsorbed molecules of oxygen gas).

The term "substantially" means at least 90%, preferably at least 95%, and more preferably at least 98%.

The term "TPA" means terephthalic acid, which has the following structural formula:

The term "viscous material" means a substance having a dynamic viscosity of from 200 centipoise (cP) to 200,000 cP at 20 degrees Celsius (° C.), wherein the dynamic viscosity is measured according to the method described later.

Additional embodiments are described in accompanying drawing(s) and the remainder of the specification, including the claims.

BRIEF DESCRIPTION OF THE DRAWING(S)

Some embodiments of the present invention are described herein in relation to the accompanying drawing(s), which will at least assist in illustrating various features of the embodiments.

FIG. 1a shows a perspective view of an embodiment of the invention device of Example 1.

FIG. 1b shows a magnified view of a detail in FIG. 1a.

DETAILED DESCRIPTION OF THE INVENTION

Figures 1A, 1B:
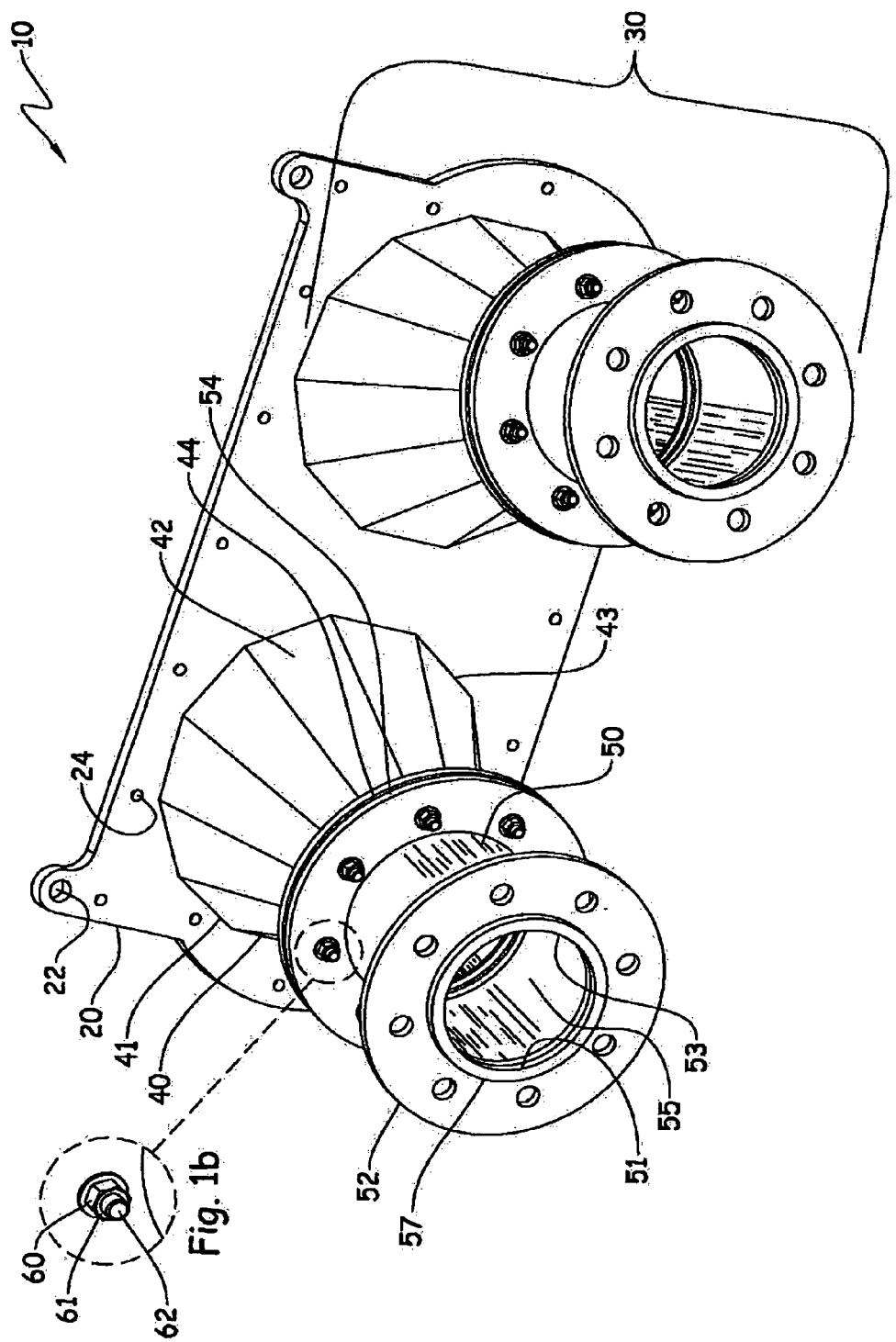

The invention relates to the method of substantially homogeneously mixing ingredients comprising solid thermoplastic particulates and a viscous material in a first container, to a non-clogging device, and to mixing apparatus comprising same, as summarized previously.

For purposes of United States patent practice and other patent practices allowing incorporation of subject matter by reference, the entire contents—unless otherwise indicated— of each U.S. patent, U.S. patent application, U.S. patent application publication, PCE international patent application and WO publication equivalent thereof, referenced in the instant Summary or Detailed Description of the Invention are hereby incorporated by reference. In an event where there is a conflict between what is written in the present specification and what is written in a patent, patent application, or patent application publication, or a portion thereof that is incorporated by reference, what is written in the present specification controls.

In the present application, any lower limit of a range of numbers, or any preferred lower limit of the range, may be combined with any upper limit of the range, or any preferred upper limit of the range, to define a preferred aspect or embodiment of the range. Unless otherwise indicated, each range of numbers includes all numbers, both rational and irrational numbers, subsumed within that range (e.g., the range from about 1 to about 5 includes, for example, 1, 1.5, 2, 2.75, 3, 3.80, 4, and 5).

The word "optionally" means "with or without." For example, "optionally, an additive" means with or without an additive.

In an event where there is a conflict between a compound name and its structure, the structure controls.

In an event where there is a conflict between a unit value that is recited without parentheses, e.g., 2 inches, and a corresponding unit value that is parenthetically recited, e.g., (5 centimeters), the unit value recited without parentheses controls.

As used herein, "a," "an," and "the," are used following an open-ended term such as comprising to mean "at least one." In any aspect or embodiment of the instant invention described herein, the term "about" in a phrase referring to a numerical value may be deleted from the phrase to give another aspect or embodiment of the instant invention. In the former aspects or embodiments employing the term "about," meaning of "about" can be construed from context of its use. Preferably "about" means from 90 percent to 100 percent of the numerical value, from 100 percent to 110 percent of the numerical value, or from 90 percent to 110 percent of the numerical value. In any aspect or embodiment of the instant invention described herein, the open-ended terms "comprising," "comprises," and the like (which are synonymous with "including," "having," and "characterized by") may be replaced by the respective partially closed phrases "consisting essentially of," "consists essentially of," and the like or the respective closed phrases "consisting of," "consists of," and the like to give another aspect or embodiment of the instant invention. The partially closed phrases such as "consisting essentially of" and the like limits scope of a claim to materials or steps recited therein and those that do not materially affect the basic and novel characteristic(s) of the claimed invention. The term "characterizable" is open-ended and means distinguishable.

In the present application, when referring to a preceding list of elements (e.g., ingredients), the phrases "mixture thereof," "combination thereof," and the like mean any two or more, including all, of the listed elements. The term "or" used in a listing of members, unless stated otherwise, refers to the listed members individually as well as in any combination, and supports additional embodiments reciting any one of the individual members (e.g., in an embodiment reciting the phrase "10 percent or more," the "or" supports another embodiment reciting "10 percent" and still another embodiment reciting "more than 10 percent."). The term "plurality" means two or more, wherein each plurality is independently selected unless indicated otherwise. The term "independently" means separately without regard for another. The terms "first," "second," et cetera serve as a convenient means of distinguishing between two or more elements or limitations (e.g., a first chair and a second chair) and do not imply quantity or order unless specifically so indicated. The symbols "≤" and "≥" respectively mean less than or equal to and greater than or equal to. The symbols "<" and ">" respectively mean less than and greater than. The term "characterizable" means capable of being distinguished, if desired.

Any headings herein are used only for convenience of the reader and do not limit, and should not be interpreted as limiting, the present invention.

Where the invention, or any portion thereof (e.g., element or step), is defined in the alternative by a Markush group having two or more members, the invention contemplates preferred embodiments too numerous to recite each one herein. For convenience, such preferred embodiments can be readily determined by: (i) selecting any single member from the Markush group, thereby limiting scope of the Markush group to the selected single member thereof; or (ii) deleting any single member from the Markush group, thereby limiting the Markush group to any one of the remaining member(s) thereof. In some embodiments the member that is selected or deleted is based on one of the Examples or other species of the present invention described herein.

This specification may refer to certain well-known testing standards promulgated by certain organizations, which are referred to herein by their acronyms. The acronym "ANSI" stands for American National Standards Institute, the name of an organization headquartered in Washington, D.C., USA. The acronym "ASTM" stands for ASTM International, the name of an organization headquartered in West Conshohocken, Pa., USA; ASTM International was previously known as the American Society for Testing and Materials. The acronym "DIN" stands for Deutsches Institut für Normung e. V., the name of an organization headquartered in Berlin, Germany. The acronym "ISO" stands for International Organization for Standardization, the name of an organization headquartered in Geneva 20, Switzerland.

Part of the invention method comprises the aforementioned feeding steps. The steps of feeding the predispersion and remaining portion of the viscous can be batch feeding steps, continuous feeding steps or a combination thereof. In some embodiments the feeding steps respectively consist essentially of feeding a batch of the predispersion and a batch of the remaining portion of the viscous material into the first container (e.g., esterification reactor). In some embodiments the feeding steps respectively comprise continuously feeding the predispersion and the remaining portion of the viscous material into the first container; and the method further comprises intermittently or continuously removing a reaction product thereof from the first container. The rate of removal (e.g., weight per hour) of the reaction product from the first container can be adjusted so as to allow the added ingredients to reside in the first container for an average amount of time (e.g., an average of about 1 hour).

Feeding of the predispersion and the remaining portion of the viscous material into the first container (e.g., esterification reactor) can be done by any means. Preferably the feeds are metered (e.g., with a full bore coriolis-type flow meter) so as to measure and control amounts and relative amounts thereof being added into the first container. Preferably, the first container has separate inlets and the feeds of the predispersion and the minor portion of the viscous material are separate and fed via a different one of the separate inlets into the first container. When the solid thermoplastic particulates comprises RPET particulates (e.g., RPET flakes or pellets) and the viscous material comprises TPA/MEG or TPA/IPA/MEG/DEG/polycondensation catalyst, preferably, the feed of the RPET/TPA/MEG predispersion or predispersion of RPET/TPA/IPA/MEG/DEG/polycondensation catalyst, as the case may be, is at a predispersion temperature of from 0° C. to 80° C., and more preferably from 45° C. to 75° C., and still more preferably from 50° C. to 65° C. Also preferably, the RPET comprises from greater than 0 weight percent (wt %) to a maximum wt % that is operable in the invention method, wherein wt % is based on the total weight of RPET plus viscous material. In some embodiments the maximum wt % that is operable in the invention method is 25 wt % of the total weight of RPET plus viscous material. In some embodiments, the RPET comprises from greater than 0 wt % to 9.9 wt % of the total weight of RPET plus viscous material.

The ingredients of the feeds or ingredients thereof can be stored until such time as the feeds are prepared. Prior to entering the first container, each feed can also be stored. Storage of the ingredients is not important. Preferably each feed is not stored but promptly added into the first container. Ingredients and feeds can be stored in any suitable storage vessel. Examples of suitable storage vessels are a particulates silo, liquid storage tank, and preparation vessel. An example of the preparation vessel is a stirred tank. For example in the preparation of PET using the invention method, measured amounts of TPA and MEG and any additional PET monomers (e.g., WA and DEG) and additional reaction ingredients (e.g., catalyst, additive, or a combination thereof) are premixed in the preparation vessel in such a way so as to prepare the viscous material. The solid thermoplastic particulates can be stored in a silo until such time as mixing with the major portion of the viscous material.

Preferably, the predispersion and remaining portion of the paste lack a solvent other than MEG, some of which can function as a solvent. In some embodiments the predispersion comprises RPET particulates, TPA, MEG, WA, DEG, and polycondensation catalyst. In such embodiments density of the predispersion preferably is less than 1,400 kilograms per cubic meter ($kg/m^3$). When RPET flakes are employed, preferably bulk density of the RPET flakes is from about 300 $kg/m^3$ to about 450 $kg/m^3$.

In some embodiments the viscous material comprises a paste, slurry, or liquid. In some embodiments the viscous material comprises the slurry or paste. In some embodiments the viscous material comprises the paste. Preferably, the viscous material comprises a substantially homogeneous mixture. When TPA and MEG or TPA, IPA, DEG, polycondensation catalyst, and MEG are employed, preferably the viscous material comprises a substantially homogeneous mixture comprising the TPA and MEG or of TPA, IPA, DEG, polycondensation catalyst, and MEG. In some embodiments the major portion of the viscous material is greater than 50% or greater and the minor portion of the viscous material is less than 50% or lesser. More preferably the major portion of the viscous material is from 60% to 80% and the minor portion of the viscous material is from 40% to 20%, respectively.

The solid thermoplastic particulates can be any shape. Preferably, the solid thermoplastic particulates have a uniform shape or an irregular shape. Examples of solid thermoplastic particulates having the uniform shape are pellets and granules. Examples of solid thermoplastic particulates having the irregular shape are flakes. In some embodiments solid thermoplastic particulates are the RPET particulates and the RPET particulates comprise RPET pellets or, preferably, RPET flakes. Preferably the solid thermoplastic particulates have a melting temperature that is less than 300° C. and greater than ambient temperature (e.g., greater than 40° C.). The solid thermoplastic particulates can have any practical size. Preferably, at least 90% of the solid thermoplastic particulates have a maximum length of 12 mm and a minimum length of 2 mm. In some embodiments at least 95% of the solid thermoplastic particulates have a maximum length of 10 mm. More preferably, at least 95% of the solid thermoplastic particulates have a length of from about 2 mm to about 10 mm.

The predispersion or viscous material can contain very minor amounts (<10 wt % based on total weight of the predispersion or viscous material) of other ingredients such as, for example, a polycondensation catalyst or an additive. Examples of suitable catalysts are antimony trioxide, germanium dioxide, titanium alcoholates (e.g., titanium ($C_1$-$C_5$) alcoholates), or a combination thereof. Examples of suitable additives are a colorant, heat stabilizer, and optical brightener. Preferably, the other ingredients are characterized as being food-grade.

Another step of the invention method comprises the aforementioned mixing the added ingredients step. The mixing or blending of the added ingredients in the first container (e.g., esterification reactor) can be performed by any suitable means (e.g., agitating, shaking, stirring, or a combination thereof) so as to produce a substantially homogeneous mixture.

The first container (e.g., esterification reactor) is adapted for the mixing of the added ingredients, and preferably for controlling temperature thereof. For example, the first container can contain guide plates and an impeller, wherein the impeller is in sequential operative connection and rotating communication with a stir shaft and stirrer motor. Alternatively, the mixing could agitate contents of the first container with a gas (e.g., air or nitrogen gas) purge or shaking the first container. Preferably, the first container contains internal heating coils so as to heat contents of the first container to a suitable temperature (e.g., from 250° C. to 280° C. for transesterification of RPET and esterification of TPA/MEG or TPA/IPA/MEG/DEG/polycondensation catalyst). Also, preferably the first container is adapted for preventing loss of vapor from headspace therein back out an inlet thereof. In some embodiments at least the predispersion feed inlet, and more preferably the predispersion feed inlet and the viscous material feed inlet of the first container is in operative connection and fluid communication with a condenser(s) for condensing any vapor (e.g., hot MEG vapor) attempting to leave the first container via the feed inlet. Preferably, the first container is an esterification reactor such as a reactor suitable for preparing the ethylene terephthalate oligomers.

The invention method is flexible and in some embodiments contemplates additional steps. For example, in some embodiments the invention method further comprises a further step or steps before the feeding step. In some embodiments, the further step comprises mixing the solid thermoplastic particulates and the major portion of the viscous material to give the predispersion. In preparing the predispersion, for example, measured amounts of the solid thermoplastic particulates and major portion of the viscous material can be metered into a mixer (e.g., a twin screw conveyor/mixer) comprising the second container, heated if desired, but not melted, (e.g., heated to 50 degrees Celsius (° C.) when using RPET, which melts at about 245° C.), and mixed so as to prepare the predispersion. The mixing or blending of ingredients to produce a feed can be performed by any suitable means (e.g., agitating, shaking, stirring, or a combination thereof). In some embodiments the mixing produces a substantially homogeneous mixture, and more preferably a homogeneous mixture. Preferably, the predispersion preferably is fed directly (e.g., via a direct connection or via an intermediary pipe) from the mixer into the first container (e.g., esterification reactor). For practical reasons, it is preferably to initiate operation of the mixer used to prepare the dispersion with the viscous material only, heating the viscous material therein, if desired, to a temperature well below melting point of the solid thermoplastic particulates, and then gradually meter into the mixer increasing amounts of the solid thermoplastic particulates until a desired concentration of solid thermoplastic particulates in the predispersion exiting the mixer is achieved. Thereafter, mixing can be continued in a continuous flow operation or be temporarily stopped if desired. Preferably, the viscous material is prepared ahead of time in a single preparation vessel, which is in operative connection and fluid communication via separate conduits to both the mixer and the first container such that the composition of the major portion of the viscous material (used to prepare the predispersion in the mixer) and the composition of the minor portion of the viscous material (added directly to the first container) are the same. Preferably, the weight of the viscous material directly entering the first container from the preparation vessel is less than the weight of the viscous material leaving the preparation vessel by the weight of the viscous material added into the mixer. That is, preferably there is no leakage or scrap of the viscous material. Powering transfers of such ingredients from their storage locations to their preparation location or the first or second container, and from the first or second container to subsequent locations can be accomplished by any suitable powering means such as, for example, gravity, a pneumatic conveying system, pump (e.g., positive displacement pump), or a combination thereof.

More preferably, the mixer comprising the second container comprises a screw conveyor/mixer (e.g., a horizontal twin screw conveyor/mixer), still more preferably the twin screw conveyor/mixer is a double shaft screw blender (e.g., Sirator DU-trough conveyor screws, available from Segler-Förderanlagen Maschinenfabrik GmbH, Berge, Germany). The Segler double shaft screw blender has two intermeshing screws having an aspect ratio (i.e., length-to-diameter ratio) of from 5 to 7. Typically, the intermeshing screws are self-cleaning and can be rotated at variable speeds (i.e., different revolutions per minute (rpm), e.g., from 20 rpm to 60 rpm). Preferably, the Segler double shaft screw blender is disposed at a slight downward pitch relative to horizontal plane. Even more preferably, the Segler double shaft screw blender is retrofitted with the invention device as described later, and thereby comprises an embodiment of the invention apparatus. Preferably when the ingredients used to prepare the predispersion comprise the RPET particulates and TPA/MEG, they dwell in the Segler double shaft screw blender for from 35 seconds to 50 seconds. Also, preferably only so much of the ingredients is added into the Segler double shaft screw blender so as to just cover the twin screws, i.e., enough to occupy from 60 percent (%) to 70% of the volumetric space therein. Preferably, the flow rate of predispersion leaving the Segler double shaft screw blender is from 0.4 meter per second (m/sec) to 0.6 m/sec when the outlet aperture thereof has a diameter of 80 mm. Also preferably, when RPET particulates in form of flakes are employed, the weight ratio of RPET flakes to viscous material (comprising TPA/MEG or TPA/MEG/IPA/DEG/polycondensation catalyst) is 1:9 or lower, and more preferably from about 1:7 to 1:8.

In some embodiments the solid thermoplastic particulates can contain contaminants and an additional step or steps before the feeding step removes the contaminants from the solid thermoplastic particulates. For example, when the RPET is obtained from post-consumer PET, the RPET can contain contaminants that have been introduced during the collection and processing thereof. Examples of the contaminants sometimes found in post-consumer RPET are colored PET (excluding RPET in light blue to dark blue colors); other colored polymers (e.g., colored polyolefins or polyvinyl chloride polymers); black particles (e.g., from processing machinery); iron dust, aluminum nuggets, stones, wood, glass, and paper. In such embodiments, the additional steps comprise passing the contaminated RPET through at least one of strong magnets (e.g., for removal of magnetized particles such as the iron dust); a sieving machine (e.g., for removal of fines of up to 2 millimeters (mm) diameter, oversized particles having diameters greater than 10 mm to 15 mm, preferably 10 mm to 12 mm, or both); an optical sorting system (e.g., to remove colored plastics); or a combination of at least two thereof.

In some embodiments the invention method further comprises a further step or steps after the feeding step. For example, when the invention method employs the solid thermoplastic particulates comprising RPET particles and the viscous material comprising a substantially homogeneous mixture comprising TPA and MEG or, preferably substantially homogeneous mixture comprising TPA, WA, DEG, polycondensation catalyst, and MEG. In some embodiments the substantially homogeneous mixture comprises TPA, IPA, DEG, and MEG. In some embodiments the substantially homogeneous mixture further comprises at least one additive other than a monomer for preparing PET, at least one additional catalyst (e.g., the polycondensation catalyst or another catalyst), or a combination thereof. In some embodiments the invention method further comprises transesterifying the RPET and reacting (esterifying) the added ingredients TPA and MEG, or preferably with the added ingredients TPA, IPA, DEG, polycondensation catalyst, and MEG, at a temperature of from 250° C. to 270° C. in such a way so as to produce a mixture comprising PET and ethylene terephthalate oligomers in the first container. In some embodiments the viscous material further comprises isophthalic acid and at least one polycondensation catalyst; and the invention method further comprises transesterifying the RPET and reacting the added ingredients TPA, IPA, DEG, polycondensation catalyst, and MEG at a temperature of from 250° C. to 270° C. in such a way so as to produce the mixture comprising PET and ethylene terephthalate oligomers in the first container. The term "ethylene terephthalate oligomer" means a molecule comprising from 2 to 10, and in some embodiment 2 to 5, residuals of TPA, WA, MEG, or DEG, wherein there is at least one residual of TPA or IPA and at least one residual of DEG or MEG, and any additional residuals independently are of TPA, IPA, MEG, or DEG. The ethylene terephthalate oligomers are useful for preparing PET via polycondensation thereof. The esterification reactions described in this paragraph can be done in the same or different containers.

In some embodiments the invention method employs the first container as a first esterification reactor and further employs a second esterification reactor, which is in operative connection and fluid communication with the first esterification reactor. In some embodiments, the invention method further comprises polycondensing the ethylene terephthalate oligomers so as to produce PET or poly(ethylene terephthalate isophthalate). Preferably, the invention method employs three polycondensation reactors in series of first, second, and third polycondensation reactors. In some embodiments the invention method further employs a solid state polycondensation step downstream from the polycondensation step of the third polycondensation reactor. More preferably, the first and second esterification reactors and first, second and third polycondensation reactors are sequentially in operative connection to, and in at least periodic fluid communication with, each other. Still more preferably, the ingredients are kept in the first and second esterification reactors and first polycondensation reactor for an average residence time and are continuously flowed through the second and third polycondensation reactors. Preferably, pressure in each of the reactors is decreased in a stepwise fashion from one reactor to the next reactor in the series, starting at a pressure from slightly greater than ambient pressure to 0.5 bar (50 kilopascals (kPa), preferably 90 kPa to 50 kPa) in the first esterification reactor and ending with approximately 1 millibar (0.1 kPa) pressure in the third polycondensation reactor. Preferably, temperature of contents in the reactors is increased in a stepwise fashion going from one reactor to the next reactor in the series, starting at a temperature of from about 255° C. to about 265° C. in the first esterification reactor (i.e., the first container) and ending with a temperature of from about 265° C. to about 285° C. in the third polycondensation reactor.

Turning to the invention device, naturally each discharge cone independently has a proximal end defining the upstream aperture and a distal end defining the downstream aperture and each aperture can be characterized by a diameter or cross-sectional area. Each discharge cone of the device has an interior surface that defines the volumetric space. Each interior surface of the discharge cone independently is configured in such a way so as to enable the clog-free operation. A preferred configuration of the interior surface of the discharge cone is of a smooth construction, more preferably polished smooth or coated with a non-stick coating such as, for example, a poly(tetrafluoroethylene). Preferably, the diameter of the upstream aperture is at most 3.5 times larger, and more preferably at most 3.0 times larger than diameter of the downstream aperture of the discharge cone.

The diameter (or cross-sectional area) of the upstream aperture of, and the volumetric space in, each discharge cone is sized relative to the diameter of downstream aperture of the discharge cone so as to enable clog-free operation thereof under the circumstances. Examples of such circumstances are a particular predispersion composition (which can influence adhering property of the predispersion to the interior surface of the discharge cone); the particular viscosity and density of the predispersion; and the particular temperature and flow rate of the predispersion.

The invention device can be constructed of any material suitable for its intended use (e.g., for use with a predispersion containing the solid thermoplastic particulates or melt thereof as the viscous material). Examples of preferred materials are polished aluminum alloy or stainless steel. In some embodiments the interior surface of the discharge cone comprises a non-stick coating such as, for example, a poly(tetrafluoroethylene) coating; or the discharge cone is constructed of a non-stick material such as, for example, poly(tetrafluoroethylene).

Turning to the invention apparatus, it is configured in such a way that the invention device would restrict flow of any material that is discharged from the mixing portion of the apparatus into the volumetric space in the device, wherein the restriction is such that the material would flow into the volumetric space in the device only via the upstream apertures of the device. Preferably, the mixing portion of the invention apparatus comprises the aforementioned Segler double shaft screw blender, except where the single discharge cone and outlets of the Segler double shaft screw blender have been replaced with the invention device, and more preferably by a two discharge-cone invention device as described later in Example 1.

Materials and Methods

Purchase RPET from a plastics recycler (e.g., Waste Management, Inc., Houston, Tex., USA). Purchase MEG, DEG, polycondensation catalyst, TPA, and IPA from Sigma-Aldrich Company, St. Louis, Mo., USA.

Dynamic Viscosity:

Measure dynamic viscosity at 20° C. using a Brookfield CAP-2000 cone and plate viscometer (Brookfield Engineering Laboratories, Inc., Middleboro, Mass., USA) and the immediately following test method. Test method: If necessary, warm up the viscometer for about 30 minutes. Calibrate the viscometer using a viscosity standard by conventional means. Set the viscometer's temperature control, dispense a test sample onto the plate, and affix an appropriate cone (as would be known) thereto such that the affixed test sample completely covers a face of the cone and extends about 1 millimeter beyond the cone's edge. Wait about from 1 minute to 3 minutes to allow the affixed test sample to reach temperature equilibrium, then execute a viscosity measurement therewith the cone being rotated at an appropriate rate for the cone (as would be known) and record the resulting outputted viscosity value for the test sample.

Non-limiting examples of the present invention are described below that illustrate some specific embodiments and aforementioned advantages of the present invention. Preferred embodiments of the present invention incorporate one limitation, and more preferably any two, limitations of the Examples, which limitations thereby serve as a basis for amending claims.

EXAMPLE(S) OF THE PRESENT INVENTION

Example 1

A 2-discharge cone device. A perspective view of the 2-discharge cone embodiment of the invention device is shown in FIG. 1a. In FIG. 1a, looking slightly downward, 2-discharge cone device 10 comprises a flow restrictor plate 20 and two discharge assemblies 30. Each discharge assembly 30 comprises a discharge cone 40; a circumferentially-apertured flange 44; an interior flange 47 (hidden, see FIG. 2); an extension tube 50; a circumferentially-apertured flange 52; a circumferentially-apertured flange 54; an exterior flange 57; 8 hexagonal internally screw-threaded nuts 60; 16 washers 61; and 8 hexagonal externally screw-threaded bolts 62. Extension tubes 50 are optional. Flow restrictor plate 20 defines two larger attachment apertures 22; a plurality of evenly spaced-apart smaller attachment apertures 24; and two discharge apertures (not shown). The attachment apertures 22 are adapted for receiving a fastener or a device for lifting, suspending, or carrying flow restrictor plate 20 or 2-discharge cone device 10. Examples of such a device are chains, hooks (e.g., crane hooks), and wires. The attachment apertures 24 are adapted for receiving a fastener (e.g., externally screw-threaded bolt) in such a way that the 2-discharge cone device 10 can be sealably and firmly attached to a complimentarily configured receiving portion of a mixer (see Example 2). Diameter of one of the discharge apertures (not shown) of flow restrictor plate 20 is indicated between points 41 and 43. Each discharge cone 40 comprises a funnel portion 42 and connecting tube 45 (hidden, see FIG. 2). Funnel portion 42 defines an upstream aperture (not shown) between points 41 and 43. Connecting tube 45 (hidden, see FIG. 2) defines a downstream aperture (not indicated) of funnel portion 42. Diameter of the downstream aperture (not shown) of funnel portion 42 of discharge cone 40 is not indicated and is described later in this paragraph. Diameter of the upstream aperture (not shown) of funnel portion 42 is indicated between points 41 and 43 and is equal to diameter of discharge aperture (not shown) of flow restrictor plate 20. Circumferentially-apertured flange 52 defines downstream aperture 55 and circumferentially-apertured flange 54 defines an upstream aperture (not shown) that is the same size as downstream aperture 55. Diameter of downstream aperture 55 is indicated between points 51 and 53 of circumferentially-apertured flange 52. Diameter of downstream aperture 55 and the upstream aperture (not shown) in circumferentially-apertured flange 54 is equal to the diameter of the downstream aperture (not shown) of funnel portion 42 and preferably is about 80 mm. The diameter of the upstream aperture (not indicated) of funnel portion 42, which is indicated between points 41 and 43, is less than 4 times the diameter of downstream aperture (not shown) of circumferentially-apertured flange 44, and, thus, is less than 4 times diameter of downstream aperture 55 of circumferentially-apertured flange 52. Preferably, the diameter of the upstream aperture (not indicated) of funnel portion 42 is less than 320 mm.

FIG. 1b shows a magnified view of a hexagonal internally screw-threaded nut 60; washer 61; and an end of hexagonal externally screw-threaded bolt 62.

Figure 2:
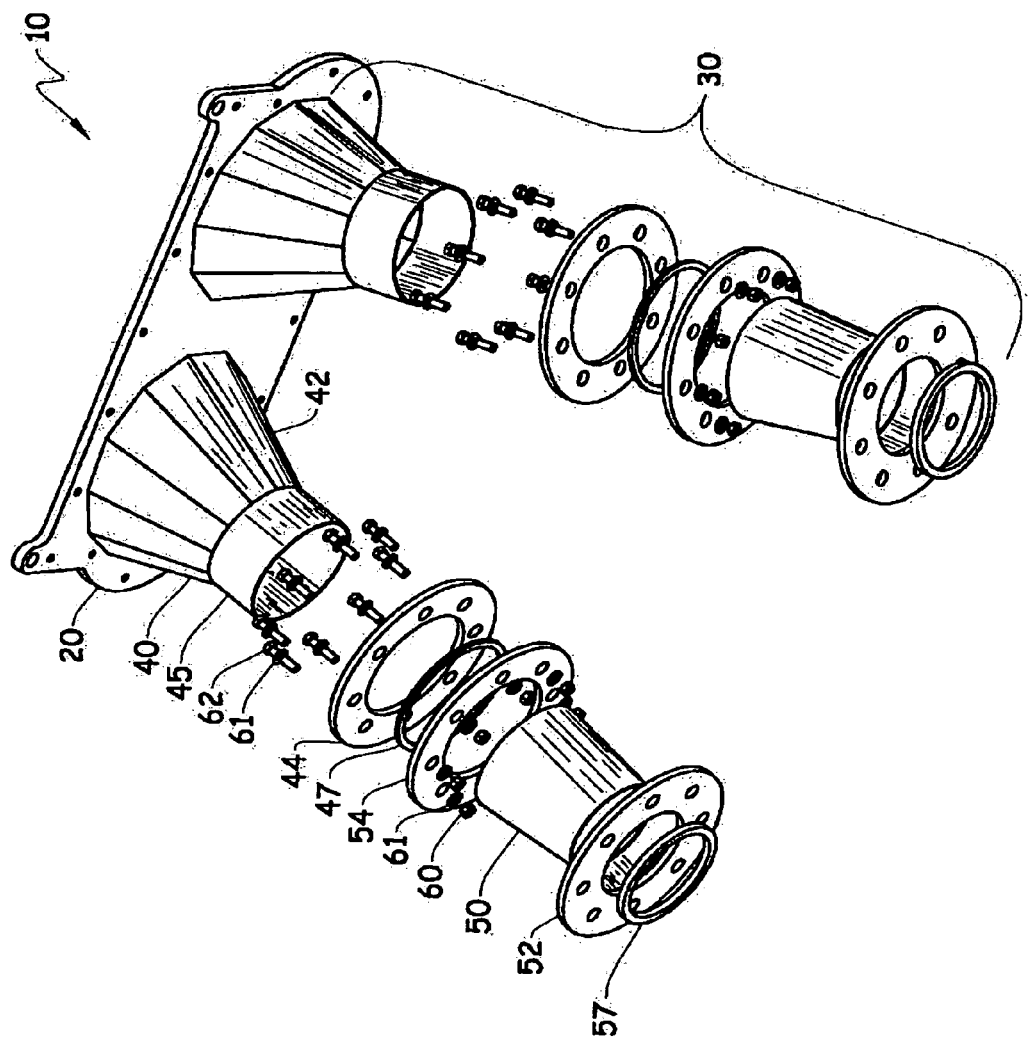
FIG. 2 shows an exploded view of the embodiment of the invention device of Example 1.

FIG. 2 shows the exploded view of the 2-discharge cone 10 comprising the flow restrictor plate 20 and two discharge assemblies 30. Connecting tube 45 of discharge cone 40 is sealably connected to circumferentially-apertured flange 44. Each extension tube 50 is sealably connected to one of circumferentially-apertured flanges 52 and 54. Circumferentially-apertured flange 54 is sealably connected to circumferentially-apertured flange 44 of discharge cone 40 via interior flange 47 and fastener assemblies comprising hexagonal internally screw-threaded nuts 60; 16 washers 61; and 8 hexagonal externally screw-threaded bolts 62. If desired, a gasket (not shown) can be interposed between circumferentially-apertured flanges 44 and 54 and interior flange 47 so as to further seal their interconnection.

Example 2

Figure 3:
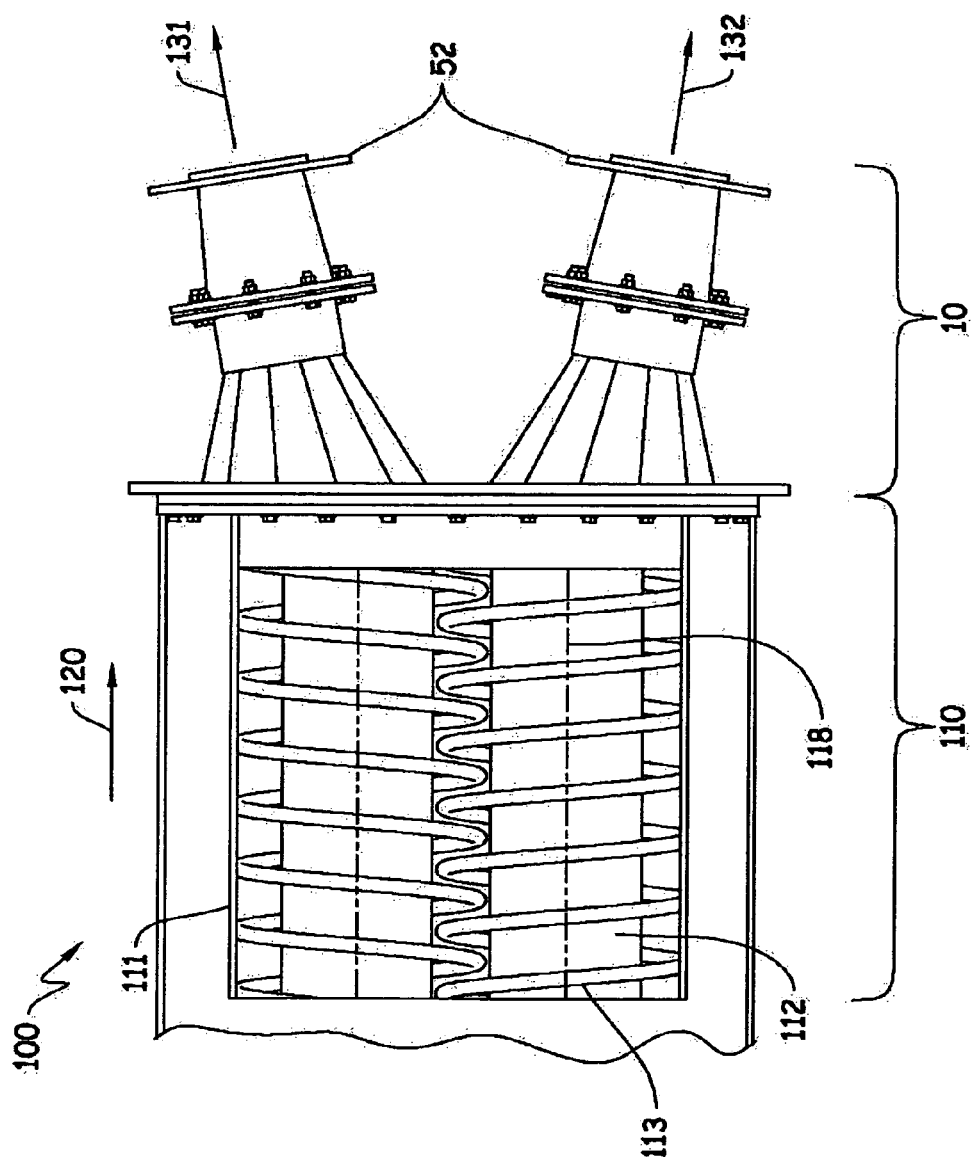
FIG. 3 shows a top down, partial view of an embodiment of the invention apparatus of Example 2.

Twin screw mixer/conveyor apparatus comprising the 2-discharge cone device. A top down, partial view of the twin screw mixer/conveyor apparatus comprising the 2-discharge cone device 10 of Example 1 is shown in FIG. 3. In FIG. 3, twin screw mixer/conveyor apparatus 100 comprises the 2-discharge cone device 10 of Example 1 in sealed operative connection to a complimentarily configured receiving portion of the heatable mixing/conveying portion 110 of the aforementioned Spirator DU-trough conveyor screws mixer from Segler-Förderanlagen Maschinenfabrik GmbH. The heatable mixing/conveying portion 110 comprises a mixing/conveying conduit 111 (the second container) and a mixing/conveying means (not indicated). The mixing/conveying means (not indicated) comprises two rotatable shafts 112, two spiral wound tubings 113, and a plurality of connecting members (not shown). The mixing/conveying means (not indicated) is disposed in the mixing/conveying conduit 111. Each rotatable shaft 112 is disposed along a longitudinal axis 118 inside of, and spaced apart from, a different one of the spiral wound tubings 113. Each spiral wound tubing 113 is fixably connected (welded) to a different one of the rotatable shafts 112 via some of the number (preferably approximately equal number or one half) of the plurality of connecting members (not shown), which are spaced sequentially around rotatable shaft 112 at about 90 degree angles from nearest neighboring (as viewed along the ad rem spiral wound tubing 113) connecting members (not shown). Enough of the Spirator DU-trough conveyor screws mixer is shown in FIG. 3 to illustrate where the 2-discharge cone device 10 connects thereto.

Example 3

Mixing RPET flakes and a paste comprising WA, MEG, DEG, IPA, and antimony triacetate or antimony ethylene glycolate as a polycondensation catalyst using the twin screw mixer/conveyor apparatus to prepare a predispersion. Referring again to FIG. 3, direction of flow of the solid thermoplastic particulates and viscous material being mixed in heatable mixing/conveying portion 110 of twin screw mixer/conveyor apparatus 100 of Example 2 to give the predispersion is indicated by arrow 120. The predispersion is then discharged through the downstream apertures 55 (see FIG. 1a) of the 2-discharge cone device 10 portion of twin screw mixer/conveyor apparatus 100 as indicated by arrows 131 and 132. Connect a hopper (not shown) containing RPET flakes (lengths of from 2 mm to 15 mm; prepared by grinding and removing any contaminants from post-consumer RPET) and connect a preparation vessel containing a known, quantity of a paste containing TPA, IPA, DEG, polycondensation catalyst, and MEG to separate inlets of the heatable mixing/conveying portion 110. From the preparation vessel (not shown) containing the known quantity of a paste containing TPA, IPA, DEG, polycondensation catalyst, MEG, continuously feed a metered major portion (i.e., major amount) of the paste into heatable mixing/conveying portion 110 of operating twin screw mixer/conveyor apparatus 100 via an upstream inlet (not shown in the partial view of FIG. 3) in heatable mixing/conveying portion 110, which is set to heat the paste to 60° C. When temperature of the paste reaches 60° C. and is flowing out the 2-discharge cone device 10 portion of twin screw mixer/conveyor apparatus 100 as indicated by arrows 131 and 132, gradually feed a metered amount of RPET flakes from the hopper via a separate inlet into heatable mixing/conveying portion 110. Meter in the RPET flakes in a gradually increasing quantity to initially to give a predispersion containing 0.5 wt % RPET flakes, then 1 wt % RPET flakes, and ultimately a 9.0 wt % concentration of the RPET flakes. Homogeneously mix the RPET flakes and paste in heatable mixing/conveying portion 110 in such a way so as to ultimately give a predispersion at 60° C. flowing at a discharge flow rate of 0.5 m/sec out of the 2-discharge cone device 10 portion of twin screw mixer/conveyor apparatus 100 as indicated by arrows 131 and 132. The ingredients of the predispersion have a residence time of 40 seconds in the heatable mixing/conveying portion 110 of twin screw mixer/conveyor apparatus 100. The predispersion is discharged from twin screw mixer/conveyor apparatus 100 without clogging. Collect the discharged predispersion in a storage vessel (not shown).

Example 4

Preparing ethylene terephthalate oligomers. Modify the equipment used in Example 3 by replacing the storage vessel with an esterification reactor fitted internally with heating coils and a stir shaft/impeller operatively connected to a stir motor. Sealably connect ring adaptor 52 of 2-discharge cone device 10 of twin screw mixer/conveyor apparatus 100 to a complimentary fitting inlet of the esterification reactor (not shown). The operative connections establish fluid communication. Also connect a separate outlet of the paste preparation vessel to another inlet of the esterification reactor. Fit inlets of the esterification reactor with a cooling condenser so that any MEG vapor attempting to back out the inlets thereof will be condensed and returned into the esterification reactor. Add a prepolymer heel comprising a quantity of ethylene terephthalate oligomers into the esterification reactor, and heat the prepolymer heel in the first esterification reactor to 255° C. to 265° C. with stirring. Then repeat the procedure of Example 3, and instead of collecting the predispersion in the storage vessel, feed the predispersion from the 2-discharge cone device 10 portion of twin screw mixer/conveyor apparatus 100 directly into the esterification reactor without clogging the device 10 or inlet of the reactor. Simultaneously feed the remaining minor portion (minor amount) of the paste directly from the preparation vessel into the esterification reactor via the other inlet therein without clogging the inlet of the reactor. Prepolymer is prepared in the esterification reactor. Stir the contents in the esterification reactor and continuously discharge from the esterification reactor the prepared prepolymer from the esterification reactor at a discharge flow rate such that the added ingredients reside in the first esterification reactor on average for about 60 minutes. The prepared prepolymer discharged from the esterification reactor is useful for preparing crystalline, food-grade PET by known esterification/polycondensation processes such as the one described previously herein.

As shown by the Examples, the invention method is useful for exposing RPET to substantially full transesterifying effect of MEG even before the RPET is melted and does not require altering esterification reaction conditions. The invention method is useful for mixing ingredients comprising the solid thermoplastic particulates (e.g., RPET flakes) and the viscous material (e.g., a paste comprising TPA and MEG, or TPA, IPA, DEG, polycondensation catalyst, and MEG) in the first container (e.g., an esterification reactor) in a reduced period of time compared to period of time for melting one or both of the ingredients and mixing them together. The invention device and apparatus are useful for discharging the predispersion from the second container without clogging the device, even in presence of hot MEG vapor, and are useful in the invention method.

While the present invention has been described above according to its preferred aspects or embodiments, it can be modified within the spirit and scope of this disclosure. This application is therefore intended to cover any variations, uses, or adaptations of the present invention using the general principles disclosed herein. Further, the application is intended to cover such departures from the present disclosure as come within the known or customary practice in the art to which this present invention pertains and which fall within the limits of the following claims.

What is claimed is:

1. A method of mixing ingredients comprising solid thermoplastic particulates and a viscous material in a first container without first melting the solid thermoplastic particulates, the method comprising:
   feeding a predispersion comprising a substantially homogeneous mixture of the solid thermoplastic particulates and a major portion of the viscous material into a first container, wherein the solid thermoplastic particulates comprise poly(ethylene terephthalate) particles and the viscous material comprises terephthalic acid and monoethylene glycol;
   feeding a remaining minor portion of the viscous material into the first container; and
   mixing the ingredients in the first container,
   wherein the major portion of the viscous material comprises a quantity of monoethylene glycol in excess of the quantity required to transesterify substantially all of the poly(ethylene terephthalate); and wherein the viscous material has a dynamic viscosity of from 200 centipoise (cP) to 200,000 cP at 20° C.

2. The method as in claim 1, the method further comprising a step before the feeding step, the further step comprising mixing the solid thermoplastic particulates and the major portion of the viscous material to give the predispersion.

3. The method as in claim 1, wherein the feeding steps respectively consist essentially of feeding a batch of the predispersion and a batch of the remaining portion of the viscous material into the first container.

4. The method as in claim 1, wherein the feeding steps respectively comprise continuously feeding the predispersion and the remaining portion of the viscous material into the first container; and the method further comprises intermittently or continuously removing a reaction product thereof from the first container.

5. The method as in claim 1, wherein the solid thermoplastic particulates comprise regularly-shaped particles or irregularly-shaped particles.

6. The method as in claim 5, wherein the solid thermoplastic particulates comprise the irregularly-shaped particles and the irregularly-shaped particles are flakes of recycled poly(ethylene terephthalate).

7. The method as in claim 1, wherein the viscous material comprises a substantially homogeneous mixture comprising terephthalic acid and monoethylene glycol.

8. The method as in claim 7, wherein the viscous material further comprises isophthalic acid and at least one of a polycondensation catalyst and diethylene glycol.

9. The method as in claim 1, wherein the poly(ethylene terephthalate) particles are recycled poly(ethylene terephthalate) particles; the viscous material comprises a substantially homogeneous mixture comprising terephthalic acid and monoethylene glycol; the feed of the predispersion is at a temperature of from 0 degrees Celsius to 70 degrees Celsius; and the recycled poly(ethylene terephthalate) comprises from greater than 0 weight percent to 50 weight percent of the total weight of the recycled poly(ethylene terephthalate) particles plus viscous material.

10. The method as in claim 9, the method further comprises transesterifying the recycled poly(ethylene terephthalate) and reacting the added ingredients terephthalic acid and monoethylene glycol at a temperature of from 250 degrees Celsius to 270 degrees Celsius in such a way so as to produce ethylene terephthalate oligomers in the first container.

11. The method as in claim 1, the method employing a device to feed the predispersion into the first container, wherein the device is effective for discharging a material from a second container into the first container without the material clogging the device, the device comprising a plurality of discharge cones; wherein each discharge cone has spaced-apart upstream and downstream apertures in fluid communication with each other, diameter of the upstream aperture being at most 4 times larger than diameter of the downstream aperture; wherein each discharge cone independently defines a volumetric space between the upstream and downstream apertures that is dimensioned and configured for containing a non-clogging amount of the material; and wherein each discharge cone independently is adapted for receiving the non-clogging amount of the material into the volumetric space through the upstream aperture and discharging the non-clogging amount of the material out of the volumetric space through the downstream aperture without clogging the device.

12. The method as in claim 11, the method employing an apparatus to prepare the predispersion and feed the predispersion into the first container, wherein the apparatus is effective for mixing a material and wherein the apparatus comprises the device and a mixing portion comprising a second container; wherein the second container has a downstream outlet defining an opening and is sealably connected to the device around and proximal to the upstream apertures of the device in such a way that the device restricts the opening of the downstream outlet of the second container to the openings of the upstream apertures of the device; and the apparatus functions in such a way that when the second container of the apparatus contains a material, the material can be discharged from the apparatus via the device without clogging the device.

* * * * *